United States Patent
Chen

(10) Patent No.: US 7,471,354 B2
(45) Date of Patent: Dec. 30, 2008

(54) BACKLIGHT MODULE AND LIQUID CRYSTAL DISPLAY

(75) Inventor: Shin-Chang Chen, Nantou County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 233 days.

(21) Appl. No.: 11/164,542

(22) Filed: Nov. 29, 2005

(65) Prior Publication Data

US 2007/0115403 A1    May 24, 2007

(51) Int. Cl.
G02F 1/1335    (2006.01)
(52) U.S. Cl. ......................... 349/65; 349/113
(58) Field of Classification Search ............ 349/65, 349/113
See application file for complete search history.

(56) References Cited

U.S. PATENT DOCUMENTS

| | | | |
|---|---|---|---|
| 5,216,411 A * | 6/1993 | Ashitomi et al. | 345/168 |
| 5,886,759 A * | 3/1999 | Mashino et al. | 349/65 |
| 6,053,619 A * | 4/2000 | Nakamura et al. | 362/609 |
| 2003/0128307 A1* | 7/2003 | Ito et al. | 349/58 |
| 2004/0028895 A1* | 2/2004 | Yamakami et al. | 428/354 |
| 2004/0121148 A1* | 6/2004 | Miyano et al. | 428/354 |
| 2005/0140848 A1* | 6/2005 | Yoo et al. | 349/64 |
| 2005/0163995 A1* | 7/2005 | Yokoyama et al. | 428/343 |
| 2005/0168968 A1* | 8/2005 | Lin et al. | 362/29 |
| 2007/0115403 A1* | 5/2007 | Chen | 349/65 |
| 2007/0172648 A1* | 7/2007 | Harai | 428/343 |

* cited by examiner

Primary Examiner—K. Cyrus Kianni
(74) Attorney, Agent, or Firm—Jianq Chyun IP Office

(57) ABSTRACT

A backlight module including a frame, a reflective adhesive tape, a fixing adhesive tape, a reflective plate, a light-guiding plate and at least one of light source, is provided. The frame has a groove at one side. The reflective adhesive tape is disposed in the groove. The fixing adhesive tape is disposed at the side of the frame, and is disposed on the reflective adhesive tape. The reflective plate is disposed in the frame, wherein a gap is formed between the reflective plate and the fixing adhesive tape, and the gap is above the reflective adhesive tape. The light-guiding plate is disposed in the frame, and is disposed on the reflective plate and the fixing adhesive tape. The light-guiding plate has at least one light-incident surface. The light source is disposed beside the light-incident surface of the light-guiding plate. The backlight module is adapted for providing uniform surface light source.

9 Claims, 6 Drawing Sheets

BACKLIGHT MODULE AND LIQUID CRYSTAL DISPLAY

BACKGROUND OF THE INVENTION

1. Field of the Invention

The present invention generally relates to a backlight module and a liquid crystal display, in particular, to a backlight module adapted for providing uniform surface light source and a liquid crystal display utilizing the backlight module.

2. Description of Related Art

With recent advancement in modern video technology, the tendency of the video device is towards light weight, big size and thin panel. The flat panel display fabricated by the opto-electronic technology and semiconductor process such as the liquid crystal display (LCD), the organic electroluminescent device (OLED) or the plasma display panel (PDP) has become the mainstream of the display device. Most of the cell phone, the digital camera, the digital video camera, the notebook and the desk-top computer utilize the LCD panel as the display screen. The LCD panel doesn't emit light itself so a backlight module is arranged below the LCD panel, to provide the surface light source for the LCD panel. Then, the LCD panel can display image.

FIG. 1 is a three-dimensional view showing a conventional backlight module. As shown in FIG. 1, the backlight module 100 comprises a frame 110, a fixing adhesive tape 12, a reflective plate 130, a light-guiding plate 140 and a light source 150. The fixing adhesive tape 120 is disposed in one side 112 of the frame 110. The reflective plate 130 is disposed in the frame 110. The light-guiding plate 140 having a light incident surface 142 is disposed in the frame 110, and on the reflective plate 130 and the fixing adhesive tape 120. The light source 150 is disposed beside the light incident surface 142 of the light-guiding plate 140. Besides, as shown in FIG. 1, optical films such as a collecting sheet 160 and a diffusion sheet 170 can be sequentially stacked on the light-guiding plate 140.

It should be noted that a prism type light-guiding plate 140 is adapted for enhancing the brightness of the backlight module 100, as shown in the enlarged part of FIG. 1. Because fasteners such as locating protrusions or pared corners may damage the structure of the prism type light-guiding plate 140, therefore, they are not suitable for locating the prism type light-guiding plate 140 in the frame 110. Accordingly, the prism type light-guiding plate 140 is generally fixed in the frame 110 by the fixing adhesive tape 120. However, when the prism type light-guiding plate 120 is fixed by using the fixing adhesive tape 120, a gap d1 (as shown in FIG. 2) may be formed between the fixing adhesive tape 120 and the reflective plate 130.

FIG. 2 is a schematic cross-sectional view showing a liquid crystal display which the backlight module shown in FIG. 1 is applied to; the cross-sectional view is drawn along line A-A'. Please refer to FIG. 2, the liquid crystal display 300 comprises the backlight module 100 and a liquid crystal display panel 200. The backlight module 100 is adapted for providing the liquid crystal display panel 200 with a surface light source in order to display. Because the gap d1 is formed between the fixing adhesive tape 120 and the reflective plate 130, the intensity of the light 190 reflected from the frame 110 within the gap d1 is different from that of the light 192 reflected by the reflective plate 130. Accordingly, the backlight module 100 would not be able to provide uniform light source, and a region 202 having non-uniform light intensity is formed in the liquid crystal display panel 180 and is corresponding to the gap d1.

SUMMARY OF THE INVENTION

Accordingly, the present invention is directed to a backlight module suitable for providing a uniform surface light source.

The present invention is also directed to a liquid crystal display, which utilizes the uniform surface light source provided by the above-mentioned backlight module, for improving the display quality thereof.

As embodied and broadly described herein, the present invention provides a backlight module comprising a frame, a reflective adhesive tape, a fixing adhesive tape, a reflective plate, a light-guiding plate and at least one light source. The frame has a groove at one side. The reflective adhesive tape is disposed in the groove. The fixing adhesive tape is disposed at the side of the frame and on the reflective adhesive tape. The reflective plate is disposed in the frame, wherein a gap is formed between the reflective plate and the fixing adhesive tape, and the gap is above the reflective adhesive tape. The light-guiding plate is disposed in the frame and on the reflective plate and the fixing adhesive tape, and the light-guiding plate has at least one light-incident surface. The light source is disposed beside the light-incident surface of the light-guiding plate.

As embodied and broadly described herein, the present invention also provides a liquid crystal display comprising a backlight module and a liquid crystal display panel. The backlight module comprises a frame, a reflective adhesive tape, a fixing adhesive tape, a reflective plate, a light-guiding plate and at least one light source. The frame has a groove at one side. The reflective adhesive tape is disposed in the groove. The fixing adhesive tape is disposed at the side of the frame and on the reflective adhesive tape. The reflective plate is disposed in the frame, wherein a gap is formed between the reflective plate and the fixing adhesive tape, and the gap is above the reflective adhesive tape. The light-guiding plate is disposed in the frame and on the reflective plate and the fixing adhesive tape, and the light-guiding plate has at least one light-incident surface. The light source is disposed beside the light-incident surface of the light-guiding plate. The liquid crystal display panel is disposed on the backlight module.

According to an embodiment of the present invention, the reflection coefficient of the reflective adhesive tape is the same as that of the reflective plate.

According to an embodiment of the present invention, a material of the reflective adhesive tape is selected from the group consisting of silver, aluminum and a combination thereof.

According to an embodiment of the present invention, a material of the reflective plate is selected from the group consisting of silver, aluminum and a combination thereof.

According to an embodiment of the present invention, the light-guiding plate is a prism type light-guiding plate.

According to an embodiment of the present invention, the backlight module further comprises a set of optical films disposed in the frame and above the light-guiding plate. The set of optical films comprises a collecting sheet and a diffusion sheet for example. The collecting sheet is disposed on the light-guiding plate, and the diffusion sheet is disposed on the collecting sheet. Besides, the collecting sheet comprises a prism type collecting sheet.

According to an embodiment of the present invention, the light source comprises a cold cathode fluorescent lamp or light emitting diode array.

According to an embodiment of the present invention, the liquid crystal display panel comprises a thin film transistor array substrate, a color filter substrate and a liquid crystal layer. The liquid crystal layer is disposed between the thin film transistor array substrate and the color filter substrate.

The backlight module of the present invention utilizes a groove formed at one side of the frame for placing the reflective adhesive tape. The light incident into the gap would be reflected by the reflective adhesive tape rather than the frame. The intensity of light reflected by the reflective adhesive tape is almost the same as that of the light reflected by the reflective plate. Therefore, the backlight module can provide a uniform surface light source, and the liquid crystal display, which the backlight module is applied to, would have better display quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic cross-sectional view showing a liquid crystal display, which the backlight module shown in FIG. 1 is applied to.

DESCRIPTION OF THE EMBODIMENTS

Figure 1:
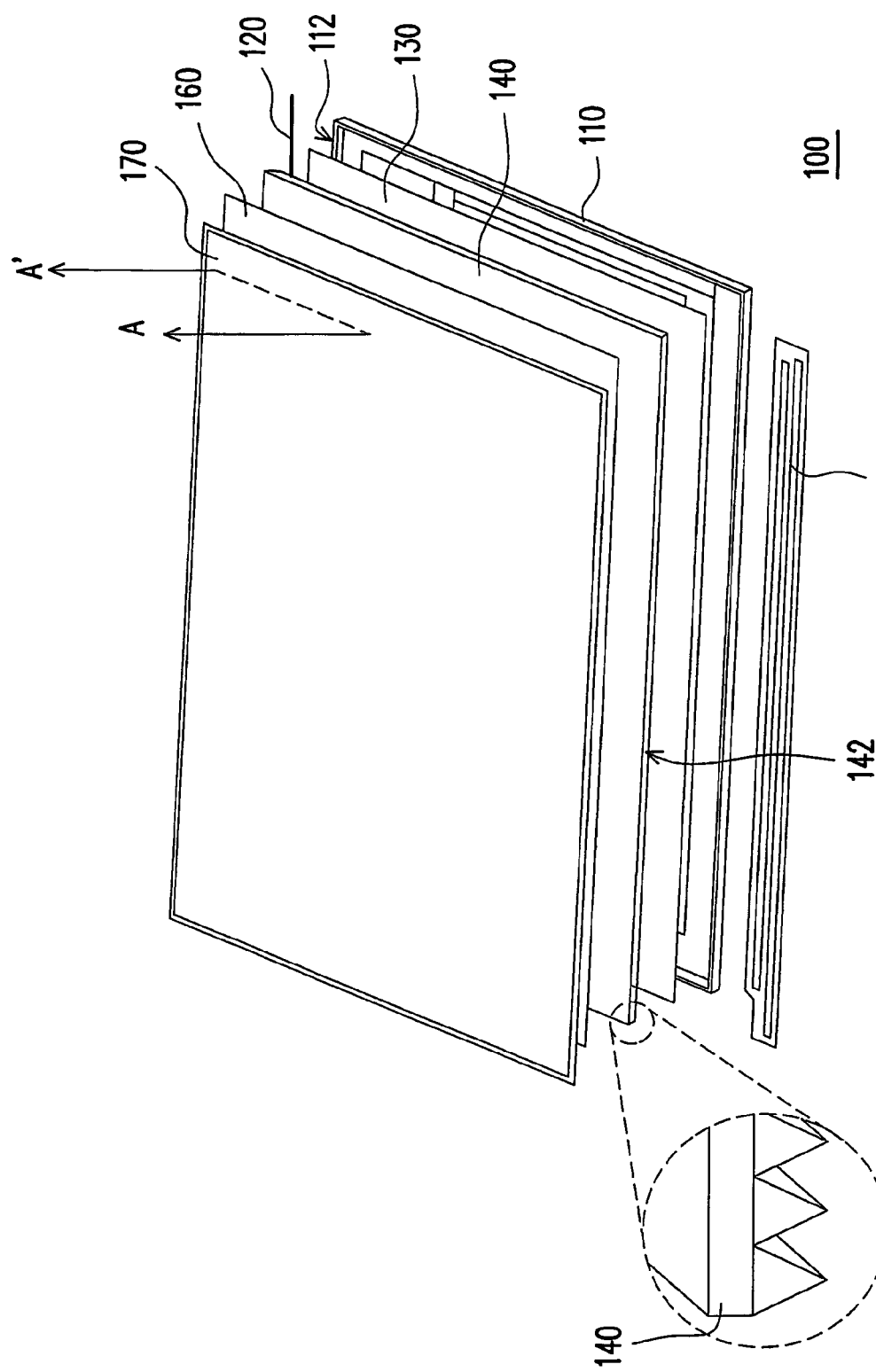
FIG. 1 is a three-dimensional view showing a conventional backlight module.
Figure 2:
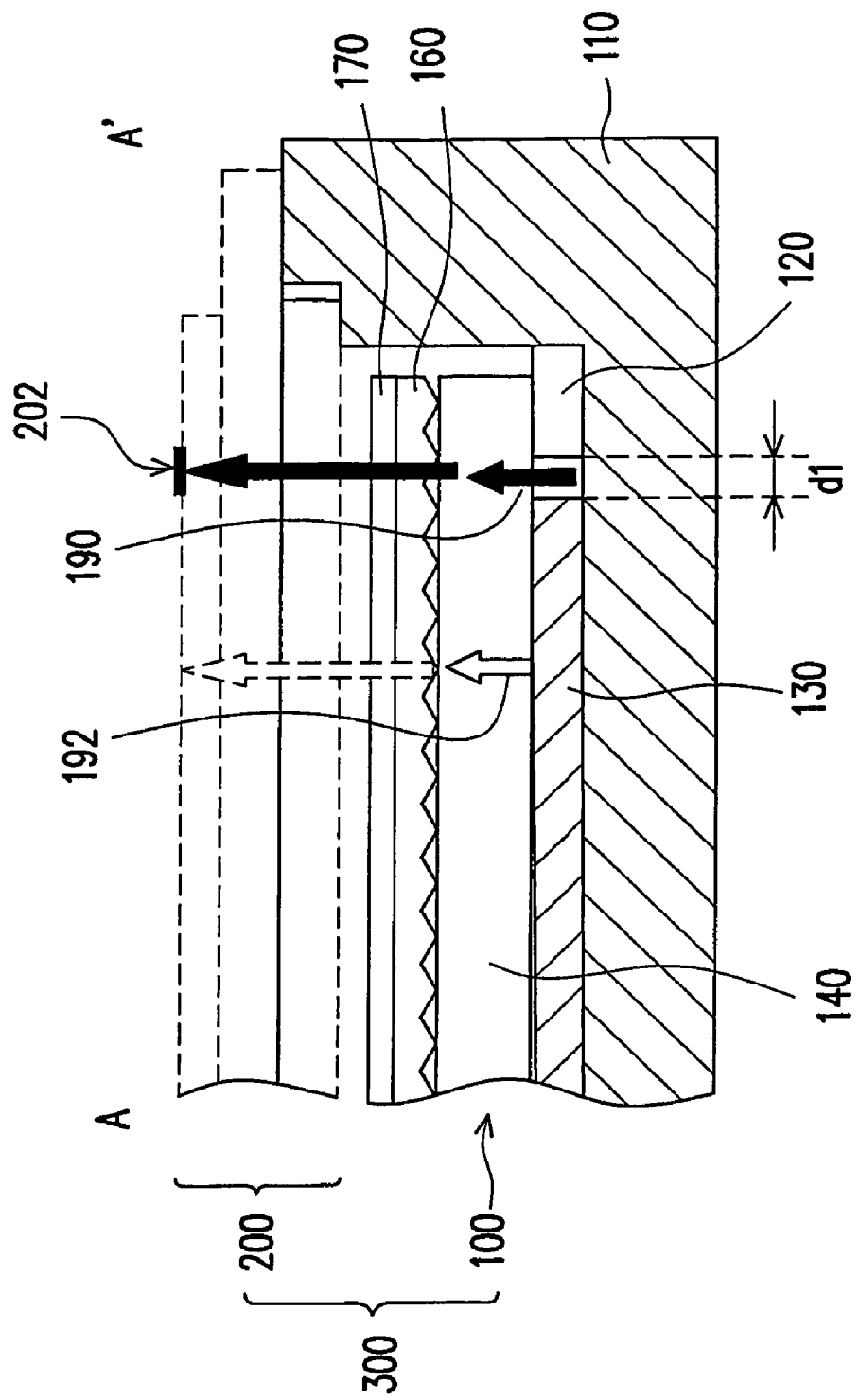
Figure 3:
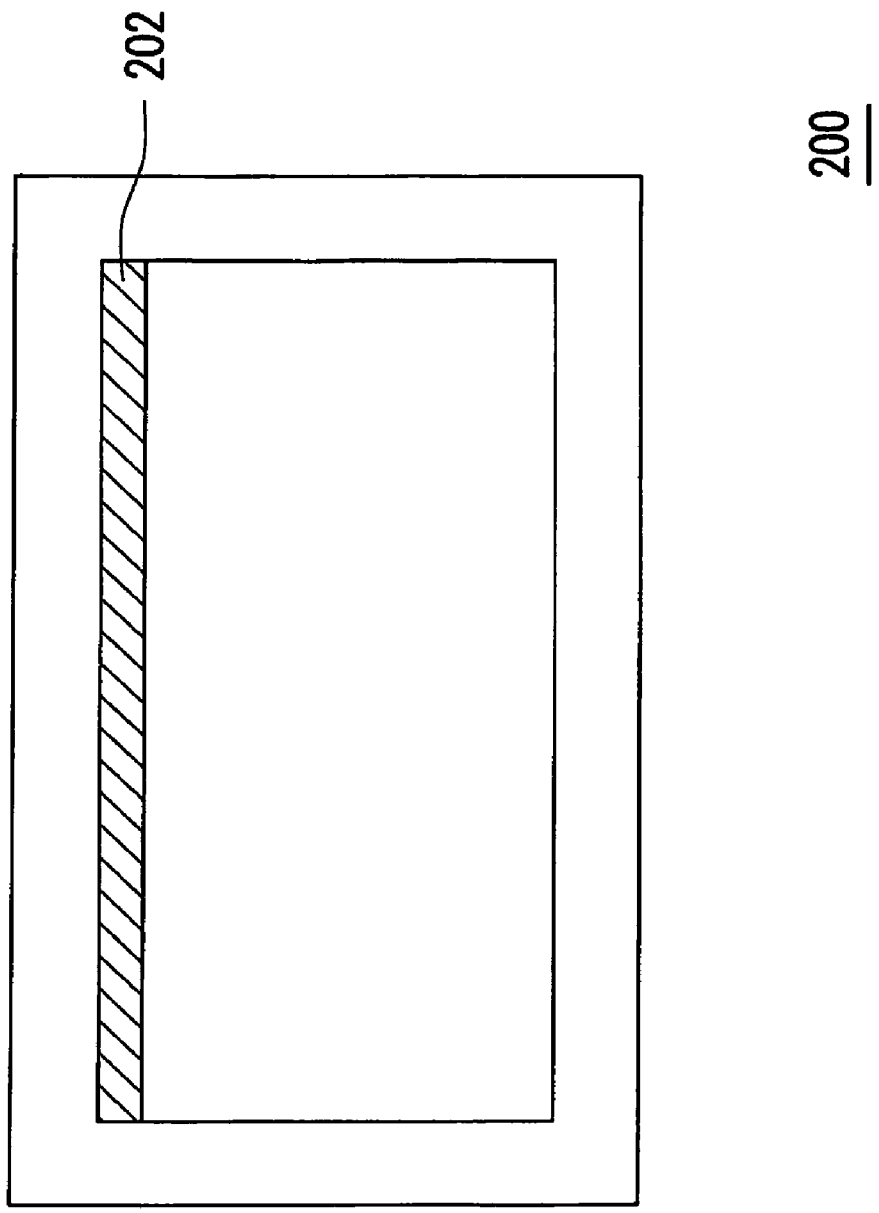
FIG. 3 is a top view showing liquid crystal display shown in FIG. 2.

Reference will now be made in detail to the present preferred embodiments of the invention, examples of which are illustrated in the accompanying drawings. Wherever possible, the same reference numbers are used in the drawings and the description to refer to the same or like parts.

Figure 4:
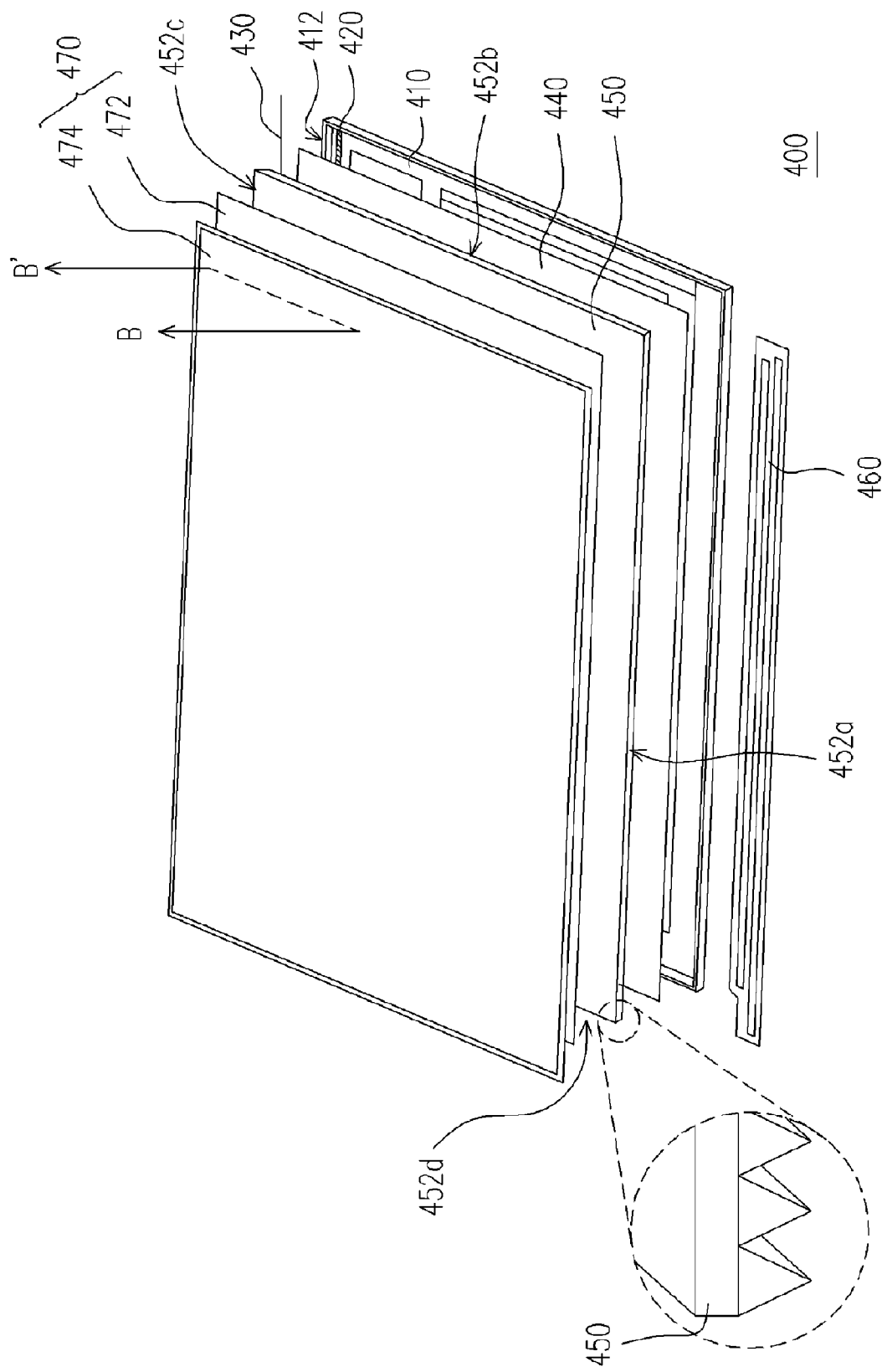
FIG. 4 is a three-dimensional view showing a backlight module according to a preferred embodiment of the present invention.
Figure 4A:
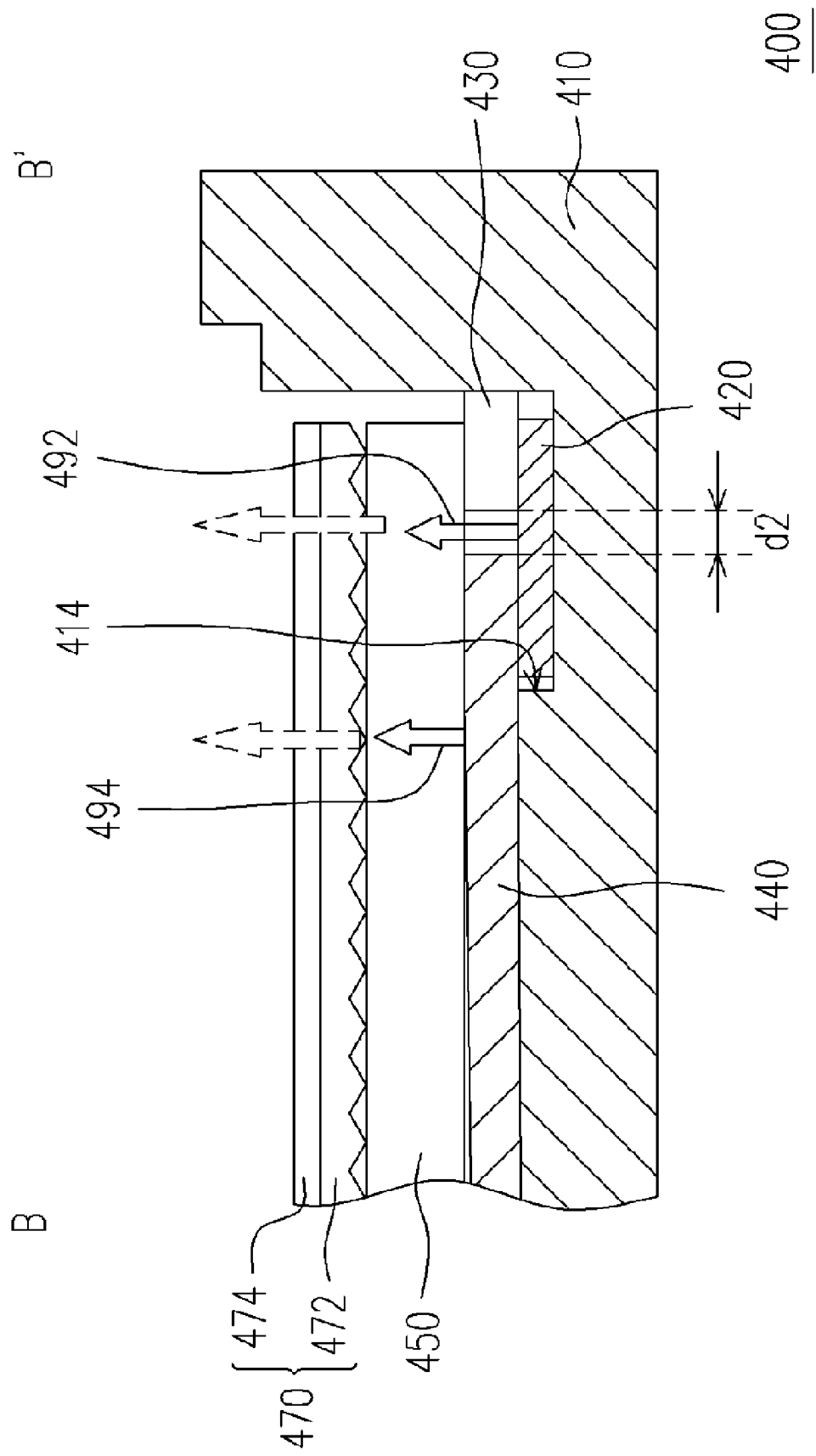
FIG. 4A is a schematic cross-sectional view showing the backlight module shown in FIG. 4 along line B-B'.

FIG. 4 is a three-dimensional view showing a backlight module according to a preferred embodiment of the present invention. FIG. 4A is a schematic cross-sectional view showing the backlight module shown in FIG. 4 along line B-B'. Please refer to FIGS. 4 and 4A, the backlight module 400 comprises a frame 410, a reflective adhesive tape 420, a fixing adhesive tape 430, a reflective plate 440, a light-guiding plate 450 and at least one light source 460. The frame 410 has a groove 414 at one side 412. The reflective adhesive tape 420 is disposed in the groove 414. The fixing adhesive tape 430 is disposed at the side 412 of the frame 410 and on the reflective adhesive tape 420. The reflective plate 440 is disposed in the frame 410, wherein a gap d2 is formed between the reflective plate 440 and the fixing adhesive tape 430, and the gap d2 is above the reflective adhesive tape 420. The light-guiding plate 450 is disposed in the frame 410 and on the reflective plate 440 and the fixing adhesive tape 430, and the light-guiding plate 450 has at least one light-incident surface 452a. The light source 460 is disposed beside the light-incident surface 452a of the light-guiding plate 450.

Please refer to the enlarged view shown in FIG. 4, the light-guiding plate 450 can be a prism type light-guiding plate. Accordingly, the light-guiding plate 450 utilizes the principle of prism to make light traveling in the light-guiding plate 450 form a surface light source, to improve the luminance thereof. Particularly, light can be incident into the light-guiding plate 450 not only through the light incident surface 452a, but also through other surfaces as the light incident surfaces 452b, 452c and 452d. Therefore, a plurality of light sources 460 (only one light source 460 is shown in FIG. 4) can be disposed beside the light incident surfaces 452b, 452c and 452d respectively, to improve the brightness of surface light source. In one embodiment of the present invention, the light source 460 can be a cold cathode fluorescent lamp (CCFL) or light emitting diode array (LED array).

Besides, as shown in FIGS. 4 and 4A, in one embodiment of the present invention, the backlight module 400 further comprises a set of optical films 470 disposed in the frame 410 and above the light-guiding plate 450. The set of optical films 470 a collecting sheet 472 and a diffusion sheet 474. The collecting sheet 472 is disposed on the light-guiding plate 450, and the diffusion sheet 474 is disposed on the collecting sheet 472. As shown in FIG. 4A, the collecting sheet 472 can be a prism type collecting sheet. The prism type collecting sheet utilizes the principle of prism to collect scattering light to a predetermined range of angle, to enhance the utilization of light. After that, light travels through the diffusion sheet 474, which makes light scatter uniformly, to form a uniform surface light source.

It should be noted that a groove 414 is previously formed below the gap d2, which is located between the fixing adhesive tape 430 and the reflective plate 440, in the frame 410. Then, the reflective adhesive tape 420 is disposed in the groove 414. Thus, the light emitted from the gap d2 is reflected by the reflective adhesive tape 420.

Particularly, in one embodiment of the present invention, the reflection coefficient of the reflective adhesive tape 420 is the same as that of the reflective plate 440. The material of the reflective adhesive tape 420 is selected from the group consisting of silver, aluminum and a combination thereof, and material of the reflective plate 440 is selected from the group consisting of silver, aluminum and a combination thereof. It means that the brightness of the light 492 reflected by the reflective adhesive tape 420 is similar to that of the light 494 reflected by the reflective plate 440. Therefore, the problem of non-uniform brightness due to the gap in the prior art can be resolved by using the backlight module 400 of the present invention.

In summary, even if a gap d2 is formed between the fixing adhesive tape 430 and the reflective plate 440, the light 492 emitted from the gap d2 is reflected by the reflective adhesive tape 420. The brightness of the light 492 reflected by the reflective adhesive tape 420 is similar to that of the light 494 reflected by the reflective plate 440. Therefore, the problem of non-uniform brightness due to the gap in the prior art can be resolved by using the backlight module 400 of the present invention. The backlight module 400 can provide a uniform surface light source. Thus, the backlight module 400 of the present invention can be applied to a LCD for getting better display quality.

Figure 5:
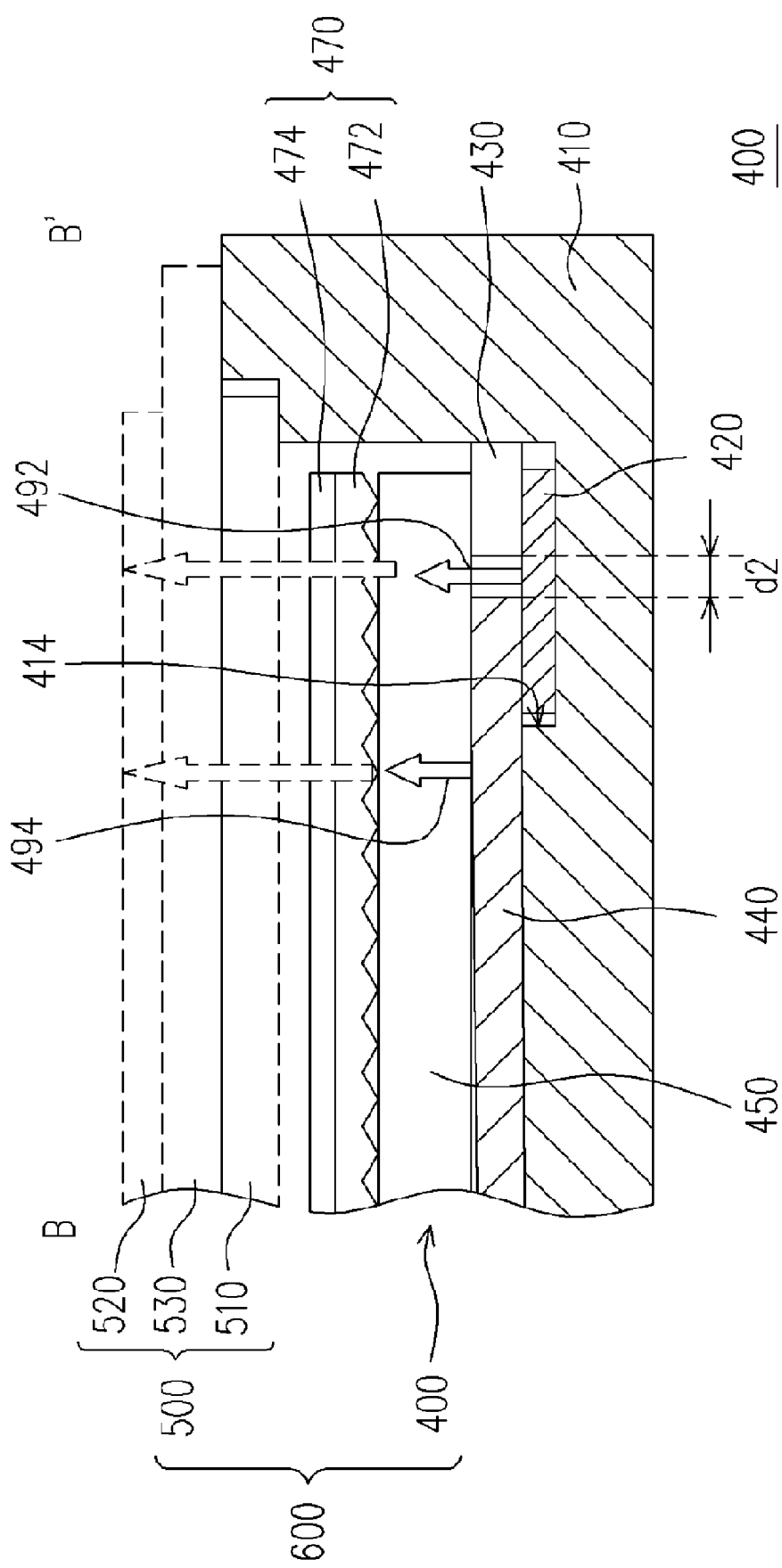
FIG. 5 is a schematic cross-sectional view showing a liquid crystal display along line B-B' shown in FIG. 4A.

FIG. 5 is a schematic cross-sectional view showing a liquid crystal display along line B-B' shown in FIG. 4A. The LCD 600 comprises a backlight module 400 as shown in FIGS. 4 and 4A, and a liquid crystal display panel 500. The structure of the backlight module 400 is described in the above, so it is not repeated herein. The liquid crystal display panel 500 is arranged on the backlight module 400, and it comprises a thin film transistor array substrate 510, a color filter substrate 520 and a liquid crystal layer 530. The liquid crystal layer 530 is disposed between the thin film transistor array substrate 510 and the color filter substrate 520. The liquid crystal display panel 500 displays images by using the surface light source provided by the backlight module 400.

Note that the frame 410 has a groove 414 disposed at one side 412, and the reflective adhesive tape 420 is disposed in the groove 414. Accordingly, even if a gap d2 is formed between the fixing adhesive tape 430 and the reflective plate 440, the light 492 emitted from the gap d2 is reflected by the reflective adhesive tape 420. The brightness of the light 492 reflected by the reflective adhesive tape 420 is similar to that of the light 494 reflected by the reflective plate 440. Thus, the backlight module 400 can provide a more uniform surface light source, to further improve the display quality of the LCD 600.

In summary, the backlight module and the LCD of the present invention have the following advantages:

In the present invention, the frame has a groove disposed at one side, and the reflective adhesive tape is disposed in the groove. Accordingly, even if a gap is formed between the fixing adhesive tape and the reflective plate, the light emitted from the gap is reflected by the reflective adhesive tape. The brightness of the light reflected by the reflective adhesive tape is similar to that of the light reflected by the reflective plate. Thus, the backlight module can provide a more uniform surface light source, and the LCD utilizing the backlight module has better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a frame having a groove at one side;
   a reflective adhesive tape disposed in the groove;
   a fixing adhesive tape disposed at the side of the frame, and disposed on the reflective adhesive tape;
   a reflective plate disposed in the frame, wherein a gap is formed between the reflective plate and the fixing adhesive tape, and the gap is above the reflective adhesive tape;
   a light-guiding plate disposed in the frame and on the reflective plate and the fixing adhesive tape, and the light-guiding plate having at least one light-incident surface; and
   at least one light source disposed beside the light-incident surface of the light-guiding plate.

2. The backlight module according to claim 1, wherein the reflection coefficient of the reflective adhesive tape is the same as that of the reflective plate.

3. The backlight module according to claim 1, wherein a material of the reflective adhesive tape is selected from the group consisting of silver, aluminum and a combination thereof.

4. The backlight module according to claim 1, wherein a material of the reflective plate is selected from the group consisting of silver, aluminum and a combination thereof.

5. The backlight module according to claim 1, wherein the light-guiding plate is a prism type light-guiding plate.

6. The backlight module according to claim 1, further comprising a set of optical films disposed in the frame and above the light-guiding plate.

7. The backlight module according to claim 6, wherein the set of optical films comprises:
   a collecting sheet disposed on the light-guiding plate; and
   a diffusion sheet disposed on the collecting sheet.

8. The backlight module according to claim 7, wherein the collecting sheet comprises a prism type collecting sheet.

9. The backlight module according to claim 1, wherein the light source comprises a cold cathode fluorescent lamp or light emitting diode array.

* * * * *